UNITED STATES PATENT OFFICE.

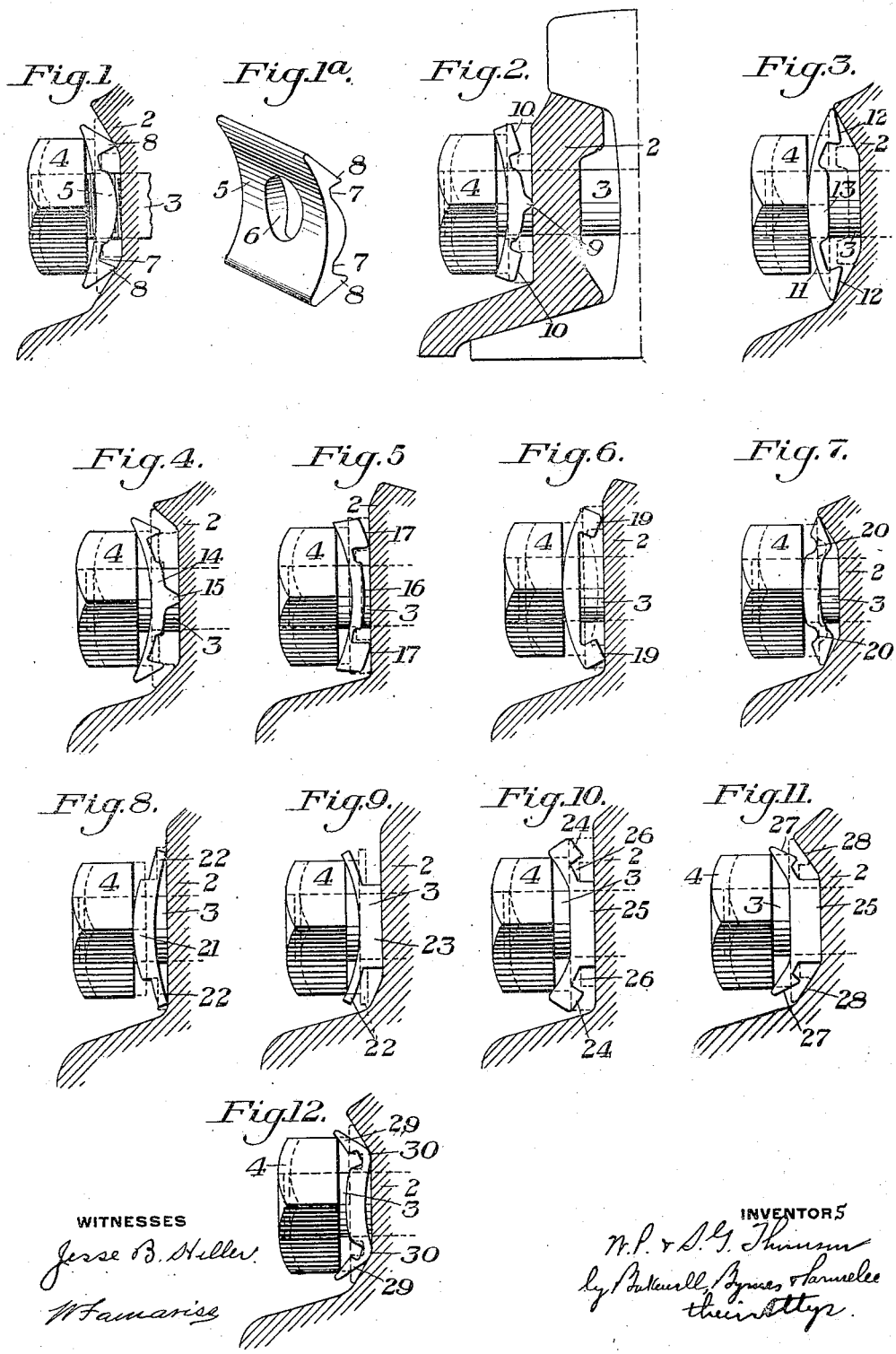

WILLIAM P. THOMSON AND SAMUEL G. THOMSON, OF PHILADELPHIA, PENNSYLVANIA, ASSIGNORS, BY MESNE ASSIGNMENTS, TO THE 100% RAIL JOINT COMPANY, OF NEW YORK, N. Y., A CORPORATION OF DELAWARE.

WASHER.

1,057,686.  Specification of Letters Patent.  Patented Apr. 1, 1913.

Application filed August 17, 1911. Serial No. 644,566.

*To all whom it may concern:*

Be it known that we, WILLIAM P. THOMSON and SAMUEL G. THOMSON, both residents of Philadelphia, in the county of Philadelphia and State of Pennsylvania, have invented a new and useful Improvement in Washers, of which the following is a full, clear, and exact description, reference being had to the accompanying drawings, forming part of this specification, in which—

Figure 1 is a side view showing one form of our improved washer applied to a bearing surface, the latter being shown in section; Fig. 1ª is a perspective view of the washer of Fig. 1; Figs. 2, 3, 4, 5, 6, 7, 8, 9, 10, 11 and 12 are views generally similar to Fig. 1, but showing different forms of the washer. In each of these Figs. 1 to 12, inclusive, the initial position of the washer is shown in full lines and its final seated position is shown in dotted lines.

Our improvement has relation to bowed spring washers which are adapted to be seated between a nut and an opposed bearing surface and which are flattened out when the nut is screwed home.

In washers of this character, there is a tendency of the washer to crack and break as it is flattened by the pressure of the nut, and the object of our invention is to provide a washer which is reinforced in such a manner as to effectively overcome this tendency and to provide for more uniform bending and spring action across the full width of the washer.

Our invention is susceptible of various embodiments a number of which are shown in the accompanying drawings, and which will now be described.

In the drawings, the numeral 2 wherever seen indicates a bearing surface for a washer and which may be the splice bar of a rail joint, or any other member through which a bolt extends.

3, wherever seen, designates a bolt, and 4 a bolt nut.

Fig. 1 illustrates a form of bowed washer 5, having a horizontal axis of curvature and having its middle portion reinforced uniformly across the region of the bolt hole 6, the reinforce decreasing in thickness across the bolt hole in opposite directions to the contracted portions 7, which are not intersected by the bolt hole. This reinforcement preferably extends the entire length or width of the washer, except where it is interrupted by the bolt hole. The concave face of the washer forms the nut-seating face, and its opposite face is provided with the projections 8, which bear against the member 2. When pressure is applied to the nut, the washer is flattened from its initial position shown in full lines to the position shown in dotted lines.

Fig. 2 shows a form of washer which is generally similar to that shown in Fig. 1, but which has its heaviest reinforcement at the middle, this reinforcement forming a bearing point 9 for contact with the member 2. In this form also the upper and lower portions of the washer are provided with the flat bearing surfaces 10, to seat against the member 2 when the washer is flattened out, thus giving the washer three bearing points, the upper and lower bearing points being continuous and the central bearing point being interrupted by the bolt hole.

Fig. 3 shows a form of washer in which the convex face 11 forms the nut-bearing surface, its concave face having the top and bottom bearing surfaces 12 and the central portion having the reinforce 13.

Fig. 4 shows a form which is similar to that shown in Fig. 3, but the central reinforce 14 has the central projection 15, to bear against the member 2.

In the form shown in Fig. 5, the central reinforce 16 is generally similar to that shown in Figs. 1 and 3, but the ribs or bearing portions 17 at the upper and lower edges thereof are very much thicker than those shown in the other figures.

Fig. 6 shows a form in which the convex face forms the nut-bearing surface, and which has its reduced portions or necks much narrower in extent than in the other figures and so shaped as to focus the bending strains just inside the edge ribs 19.

Fig. 7 shows another form in which the convex face forms the nut-bearing face, but in which the recesses 20 which form the necks are on the outer or nut-bearing side instead of on the inner side, as in the previous figures.

Fig. 8 shows a form of washer having a convex outer or nut-bearing face with an offset reinforcement 21, on its outer face across the region of the bolt hole, the upper and lower edge portions 22 of the washer being relatively thin.

Fig. 9 shows a form of washer in which the concave face forms the nut-bearing face and the reinforcement 23 is at the opposite side, the upper and lower edge portions being as in Fig. 8.

Fig. 10 shows a form generally similar to that of Fig. 9, except that the edge portions are provided with the bearing ribs 24, which are separated from the central reinforcement 25 by the recesses 26.

Fig. 11 shows a slight modification of the form of Fig. 10, and differs from the form shown in that figure in that the bearing ribs have beveled faces 27, which are adapted to fit slanting faces 28 on the member 2, instead of a straight surface as in Fig. 10.

Fig. 12 shows a form of washer somewhat similar to that shown in Fig. 7, except that instead of a single vertical bearing for the nut, as in Fig. 7, its upper and lower portions are bent outwardly, as shown at 29, giving the nut a three-fold bearing thereon. This washer has two bearing points at 30 against the member 2, these bearings points being between the bolt hole and the adjacent parallel outer edges of the washer instead of at the extreme outer edges, as in Fig. 7.

While as above stated, we have shown in each case the bearing member 2 as being a splice bar or a portion thereof, it is to be understood that this is not to be regarded as a limitation of the application of our invention, since washers of this type may be adapted to be used on any sort of bearing face on which a spring washer may be clamped by a bolt or nut.

A plate washer of equal sectional thickness throughout will bend all at one point across the diameter of the bolt hole. Our improvement, as hereinbefore described, permits the distribution of the strains equally across the hole, the greater portion of the bending being transmitted to a point outside of the hole, where there is a line of unbroken metal extending entirely across the washer and where breakage is less apt to occur. The spring action, therefore, becomes more uniform, so that the washer can be made of tempered spring steel, capable of being flattened from a curved position without any danger of tearing the metal apart at any one point. By varying the thickness of the washer across the hole, the strains are uniformly distributed in such a manner that if the washer were made flat and then heated and bent, the curvature across the hole could be made quite uniform, instead of having a sharp kink through the center of the hole. Most or all of this spring action can be removed from the region of the hole by making the sectional thickness great enough across the hole; in which case, all the bending and spring of the washer takes place between the edge of the hole and the adjacent edge of the washer, leaving a flat portion across the hole. Any variation between this condition and the condition of uniform bending can be obtained by varying the sectional thickness of the washer across the hole. It is therefore apparent that we can construct a bowed spring washer which will not break through the hole and which will have the strains evenly distributed equally across it or diverted outside of the hole, where there is less possibility of breakage. In this manner a washer of tempered steel which is relatively short, but which will have a relatively large amount of curvature may be provided. We are also able at the same time to so proportion the washer in the region across the bolt hole as to locate with certainty the point or points at which the washer may bend without breaking.

We claim:

1. A bowed spring washer, having a bolt hole therethrough, and having also a reinforce extending from end to end across it, said reinforce being of a width at the bolt hole substantially equal, at least, to the diameter of the bolt hole.

2. A bowed spring washer, having a bolt hole therethrough, and having also a reinforce extending entirely from end to end across it, said reinforce being of a width at the bolt hole substantially equal, at least, to the diameter of the bolt hole, the direction of the reinforce being parallel to the axis of curvature of the washer.

3. A bowed spring washer, having relatively thin portions at opposite sides of the center, and a thickened central portion extending from end to end of the washer and having a bolt hole extending therethrough, the thickened portion having a width which is at least equal to the width of said hole.

4. A bowed washer, having a thickened central portion extending across it, with the bolt hole of the washer extending therethrough, the thickened portion diminishing in thickness toward opposite sides.

5. A bowed washer, having a thickened central portion extending across it, with the bolt hole of the washer extending therethrough, the thickened portion diminishing in thickness from the center thereof toward opposite sides.

6. A bowed spring washer, having its central portion thickened, a thinner portion at each side of the thickened portion, and a thickened portion outside of each thinner portion.

7. A bowed washer, having one of its faces provided with three separated substantially parallel bearing portions.

8. A bowed washer, having one of its faces provided with three separated substantially parallel bearing portions, one of said portions extending across the center of the washer, and the others being between the center and the edges of the washer.

9. A bowed washer, having one of its faces provided with three separated substantially parallel bearing portions, one of said portions extending across the center of the washer, and the others being between the center and the edges of the washer, the said portions being separated by recesses extending entirely across the washer.

10. A bowed spring washer, having a neck portion of substantially uniform thickness extending from end to end across it, and a thicker portion at each side of said neck, one of said thicker portions having the bolt hole therethrough.

11. A bowed washer, having a thickened reinforce extending across its central zone and forming a projecting bearing portion on one face of the washer, and also having a parallel bearing portion at each side of the said reinforce and separated therefrom by relatively thinner portions.

12. A bowed spring washer, thickened along opposite edges and perforated through its medial portion which is thickened along a line parallel to said opposite edges, said medial portion diminishing in thickness in opposite directions to form contracted necks lying adjacent to and parallel to said thickened opposite edges.

In testimony whereof, we have hereunto set our hands.

WILLIAM P. THOMSON.
SAMUEL G. THOMSON.

Witnesses:
  MORRIS L. KOLB,
  McLEOD THOMSON.